(12) United States Patent
Stevens

(10) Patent No.: US 6,485,396 B2
(45) Date of Patent: Nov. 26, 2002

(54) ANGLE ADJUSTABLE HANDLE FOR EXERCISE BIKE

(76) Inventor: Kerry Peter Stevens, 372 Hills Borough Road, Auckland (NZ)

( * ) Notice: Subject to any disclaimer, the term of this patent is extended or adjusted under 35 U.S.C. 154(b) by 57 days.

(21) Appl. No.: 09/828,641

(22) Filed: Apr. 9, 2001

(65) Prior Publication Data

US 2002/0147080 A1 Oct. 10, 2002

(51) Int. Cl.[7] .............................................. B62K 21/12
(52) U.S. Cl. ........................................ 482/57; 74/551.8
(58) Field of Search ............................. 482/51, 52, 54, 482/57, 61, 66, 69, 72, 148, 902; 600/481; 74/551.1, 551.8, 551.9

(56) References Cited

U.S. PATENT DOCUMENTS 6,165,129 A * 12/2000 Bates ......................... 600/481
6,204,752 B1 * 3/2001 Kishimoto .................. 340/432
6,305,241 B1 * 10/2001 Masui et al. ................ 74/551.8

* cited by examiner

Primary Examiner—Glenn E. Richman
(74) Attorney, Agent, or Firm—Charles E. Baxley

(57) ABSTRACT

An angle adjustable handle assembly includes a positioning tube fixedly connected to a handle post of an exercise bike and has a toothed end. A sleeve movably extends through the positioning tube and has a head is on a first end of the sleeve and the head has a toothed shoulder which is engaged with the toothed end of the positioning tube. A second end of the sleeve is threadedly connected to a locking member. A handle extends through the sleeve and a bolt extends through the head of the sleeve and is engaged with the handle. The sleeve and the handle can be pulled to disengage from the toothed end of the tube and rotated to desired angle and then re-engage with the toothed of the tube.

4 Claims, 7 Drawing Sheets

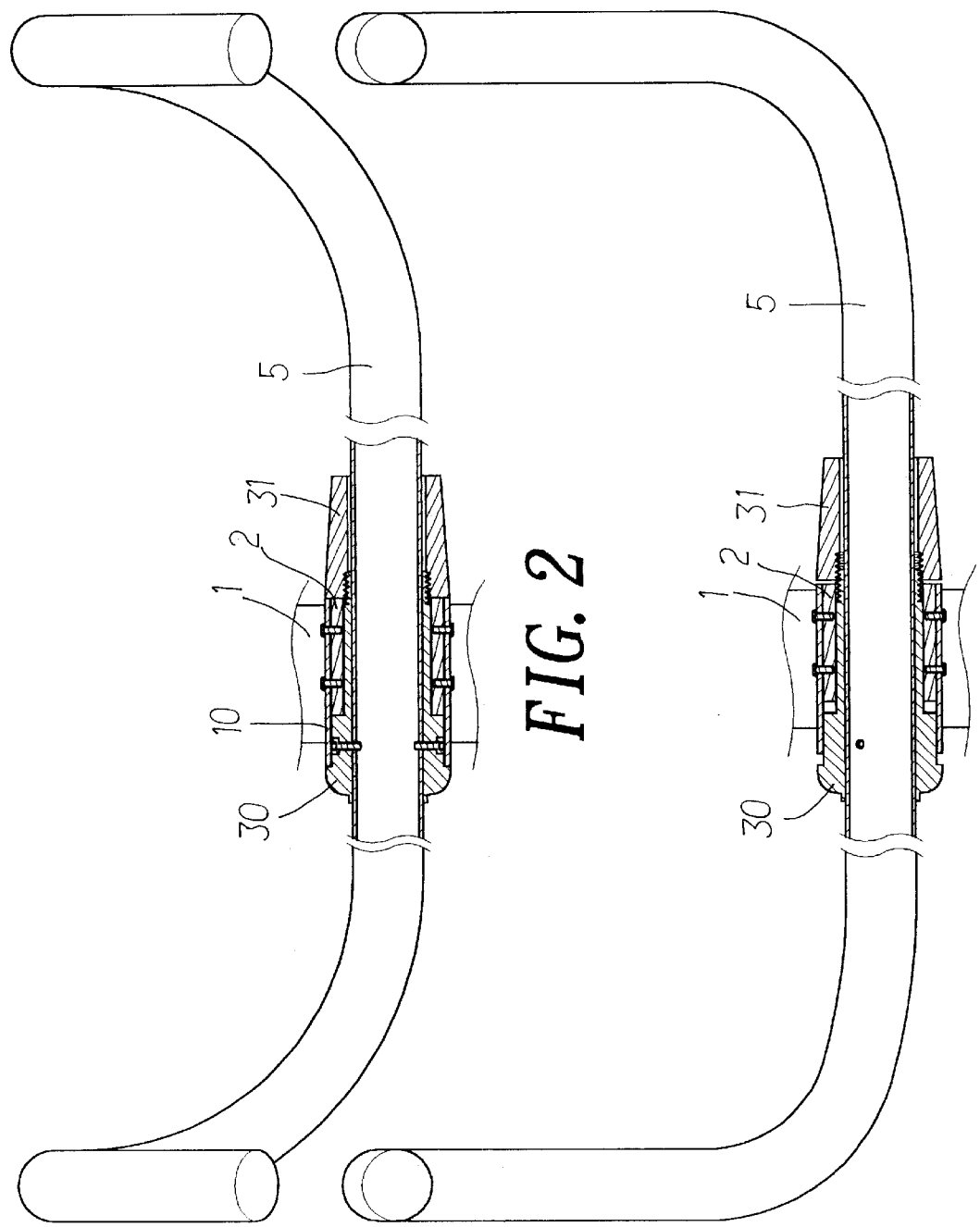

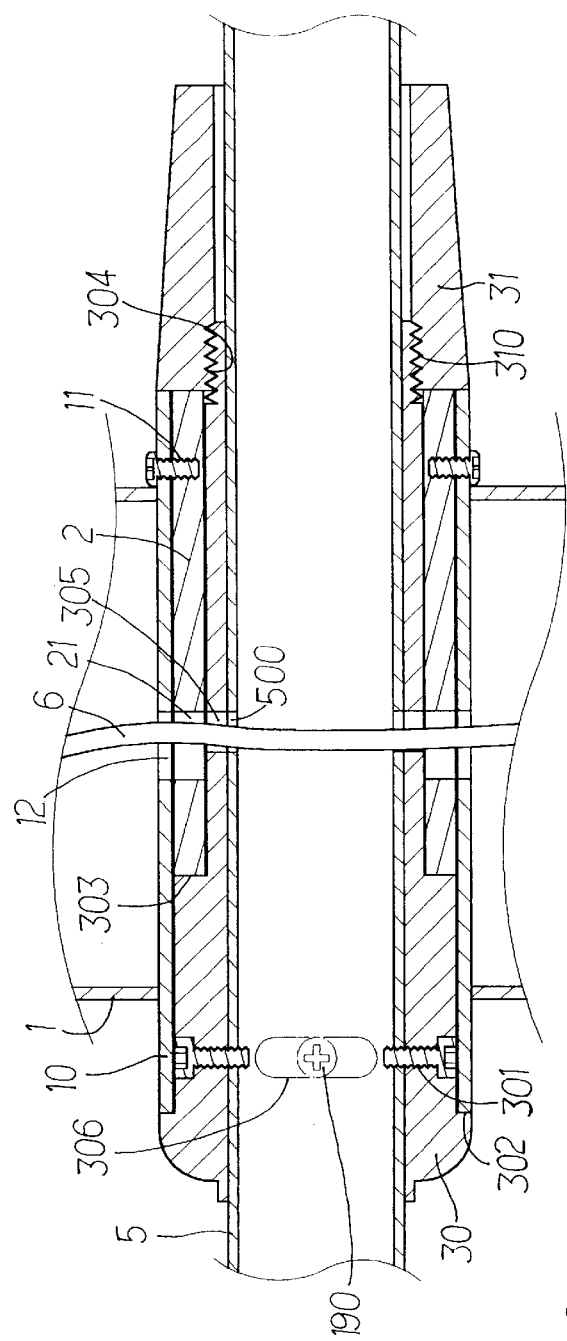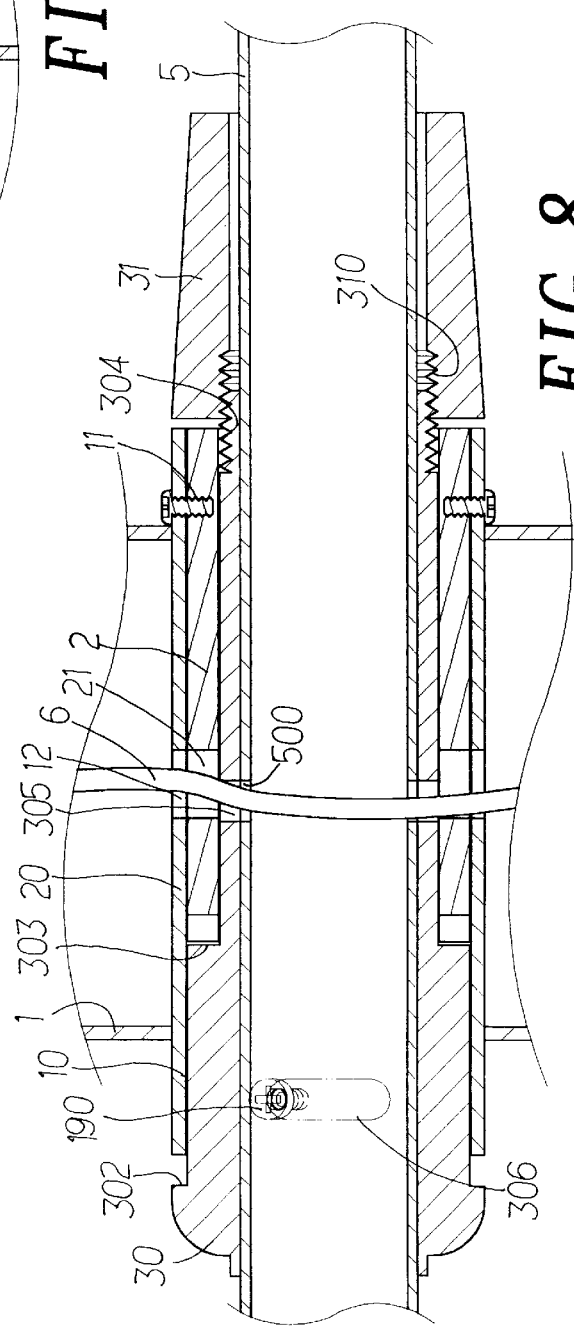

ANGLE ADJUSTABLE HANDLE FOR EXERCISE BIKE

FIELD OF THE INVENTION

The present invention relates to an angle adjustable handle for exercise bike and includes a clutch device to prevent the handle from rotating after the angle is set.

BACKGROUND OF THE INVENTION

A conventional exercise bike generally includes a base with a frame extending from the base. A seat post and a handle post are respectively connected to the frame. A wheel with a resistance device is connected to the frame and is rotated by operating a crank. The user sits on the set on a top of the seat post and holds the handle with two hands and rotates the crank with his/her feet to overcome the resistance force of the resistance device to rotate the wheel. Generally, the handle is fixedly connected to the frame by bolts or by way of welding so that the position of the handle cannot be adjusted. For the users with different heights, the fixedly positioned handle is not convenient for them and no matter the position of the handle is too high or too low, the shoulder of the user could not feel good. Some exercise bikes has a retractable handle post which can be pulled higher or pushed lower to meet the users' needs. However, the handle itself is fixed to the handle post so that it cannot be pivoted about a horizontal axis.

SUMMARY OF THE INVENTION

In accordance with one aspect of the present invention, there is provided an angle adjustable handle assembly and comprising a positioning tube fixedly connected to a handle post and having a toothed end. A sleeve movably extends through the positioning tube and has a head on a first end of the sleeve. The head has a toothed shoulder which is engaged with the toothed end of the positioning tube. A threaded portion is defined in a second end of the sleeve and a locking member is threadedly engaged with the threaded portion. A handle extends through the sleeve and a bolt extends through the head of the sleeve and is engaged with the handle.

The primary object of the present invention is to provide an angle adjustable handle for an exercise bike wherein the handle is easily rotated about a horizontal axis so that the users can adjust the handle for their needs.

The present invention will become more obvious from the following description when taken in connection with the accompanying drawings which show, for purposes of illustration only, three preferred embodiments in accordance with the present invention.

BRIEF DESCRIPTION OF THE DRAWINGS

FIG. 2 is a cross sectional view to show the handle assembly of the present invention;

FIG. 3 is a cross sectional view to show the handle assembly of the present invention is rotated an angle;

FIG. 7 is a cross sectional view to show the handle assembly of the present invention as shown in FIG. 6;

FIG. 8 is a cross sectional view to show the handle assembly shown in FIG. 7 is rotated an angle;

DETAILED DESCRIPTION OF THE PREFERRED EMBODIMENTS

Figure 1:
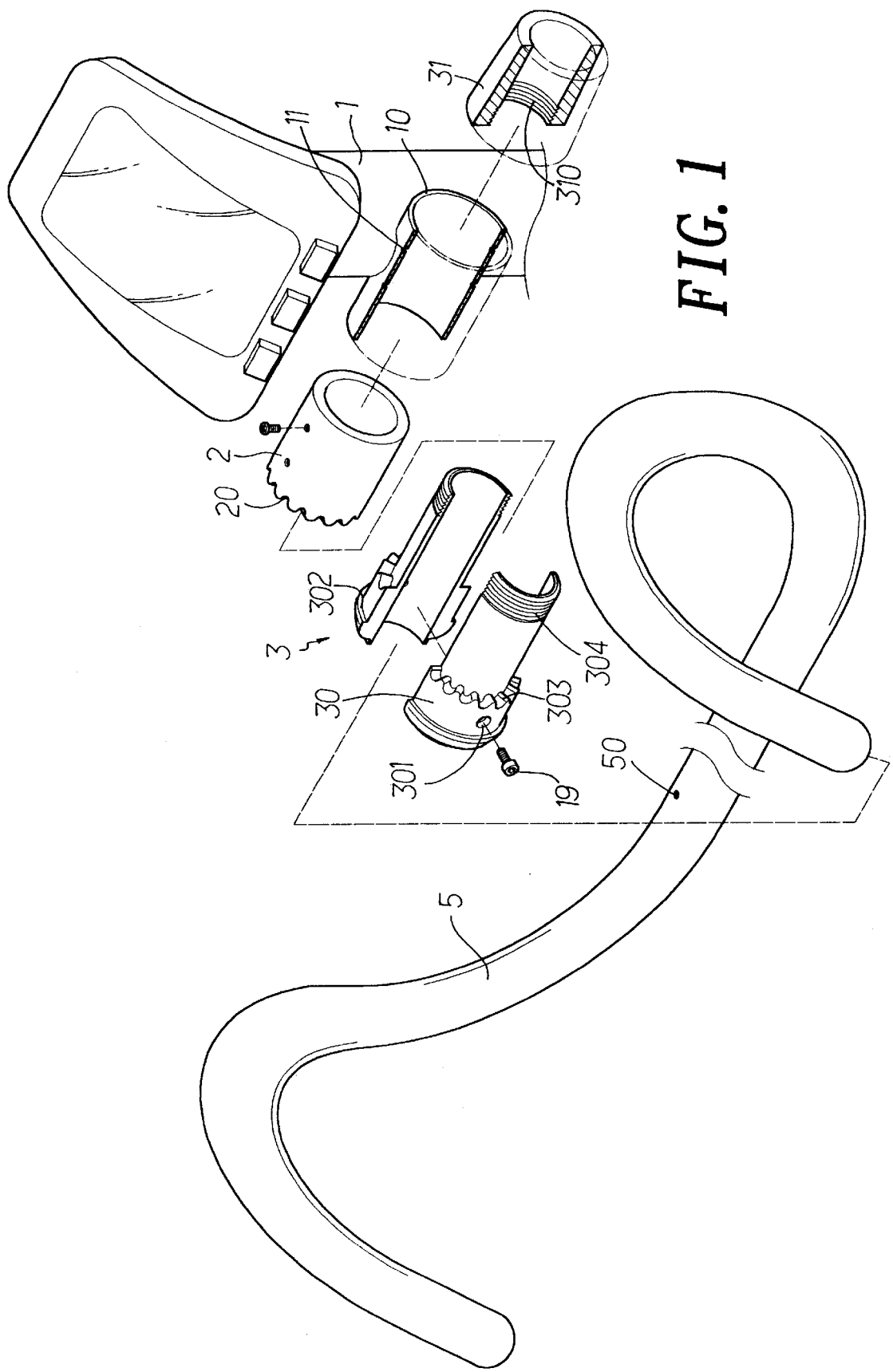
FIG. 1 is an exploded view to show a first embodiment of the handle assembly of the present invention.
Figure 4:
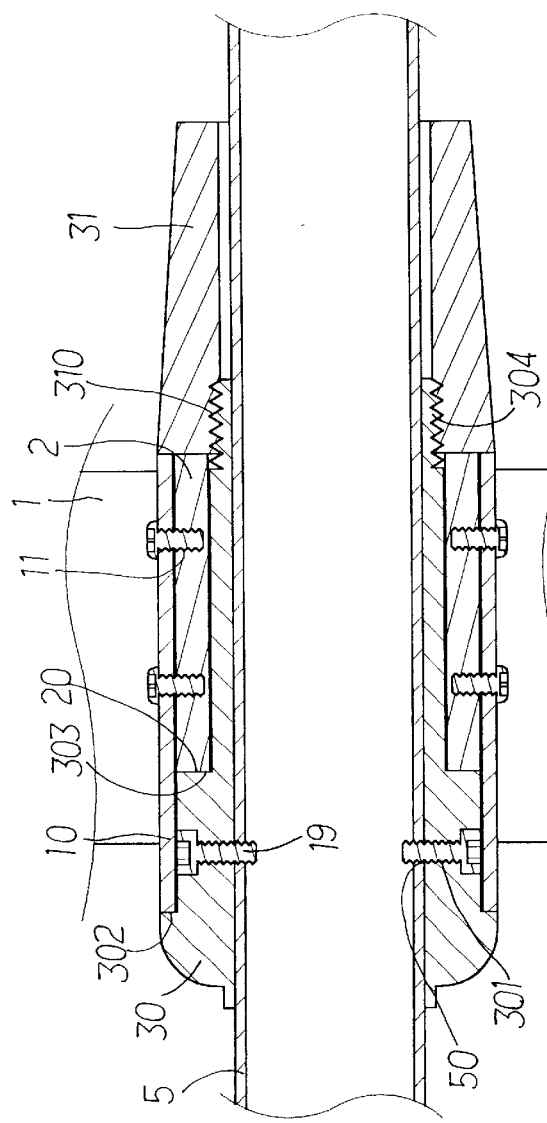
FIG. 4 is an enlarged cross sectional view to show the handle assembly of the present invention as illustrated in FIG. 2.

Referring to FIGS. 1, 2 and 4, the handle assembly for an exercise bike of present invention comprises a tube 10 which is fixedly and transversely connected to a handle post 1. A positioning tube 2 is fixedly received in the tube 10 by bolts extending through holes 11 in the tube 10 and contacting the positioning tube 2. The positioning tube 2 has a toothed end 20.

A sleeve 3 movably extends through the positioning tube 2 and has a head 30 on a first end of the sleeve 3. The head 30 has a toothed shoulder 303 which is engaged with the toothed end 20 of the positioning tube 2 so as to prevent the sleeve 3 from rotating. A threaded portion 304 is defined in a second end of the sleeve 3 and extends out from the tube 10 so as to be threadedly engaged with a threaded inner periphery 310 of a locking member 31. A A handle 5 extends through the sleeve 3 and a bolt 19 extends through a hole 301 in the head 30 of the sleeve 3 and is engaged with a hole 50 in the handle 5. The head 30 of the sleeve 3 has a flange 302 which contacts an end of the tube 11 and the locking member 31 contacts the other end of the tube 11 to securely position the handle 5.

Figure 5:
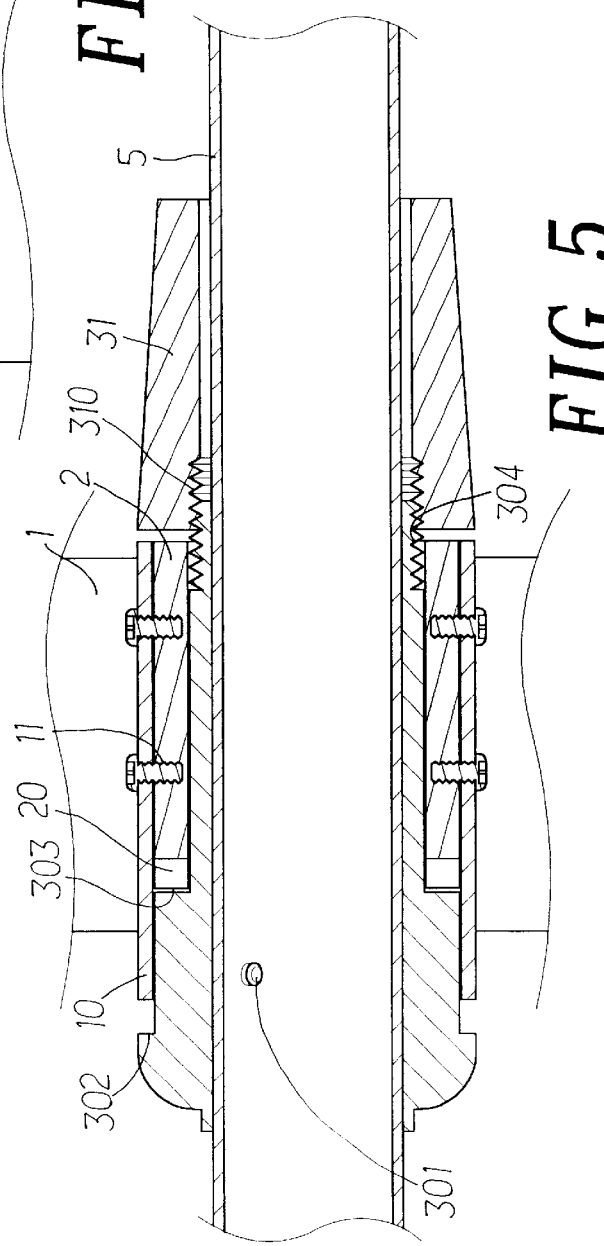
FIG. 5 is an enlarged cross sectional view to show the handle assembly of the present invention as illustrated in FIG. 3.

As shown in FIGS. 3 and 5, when adjusting the angle of the handle 5, the blocking member 31 is unscrewed from the threaded portion 304 on the sleeve 3 and the handle 5 together with the sleeve 3 are pushed left to disengage the toothed shoulder 303 of the head 30 of the sleeve 3 from the toothed end 20 of the positioning tube 2. Then the handle 5 can be rotated to a desired angle and then reengage the toothed shoulder 303 of the head 30 of the sleeve 3 from the toothed end 20 of the positioning tube 2, and locking the locking member 31.

Figure 6:
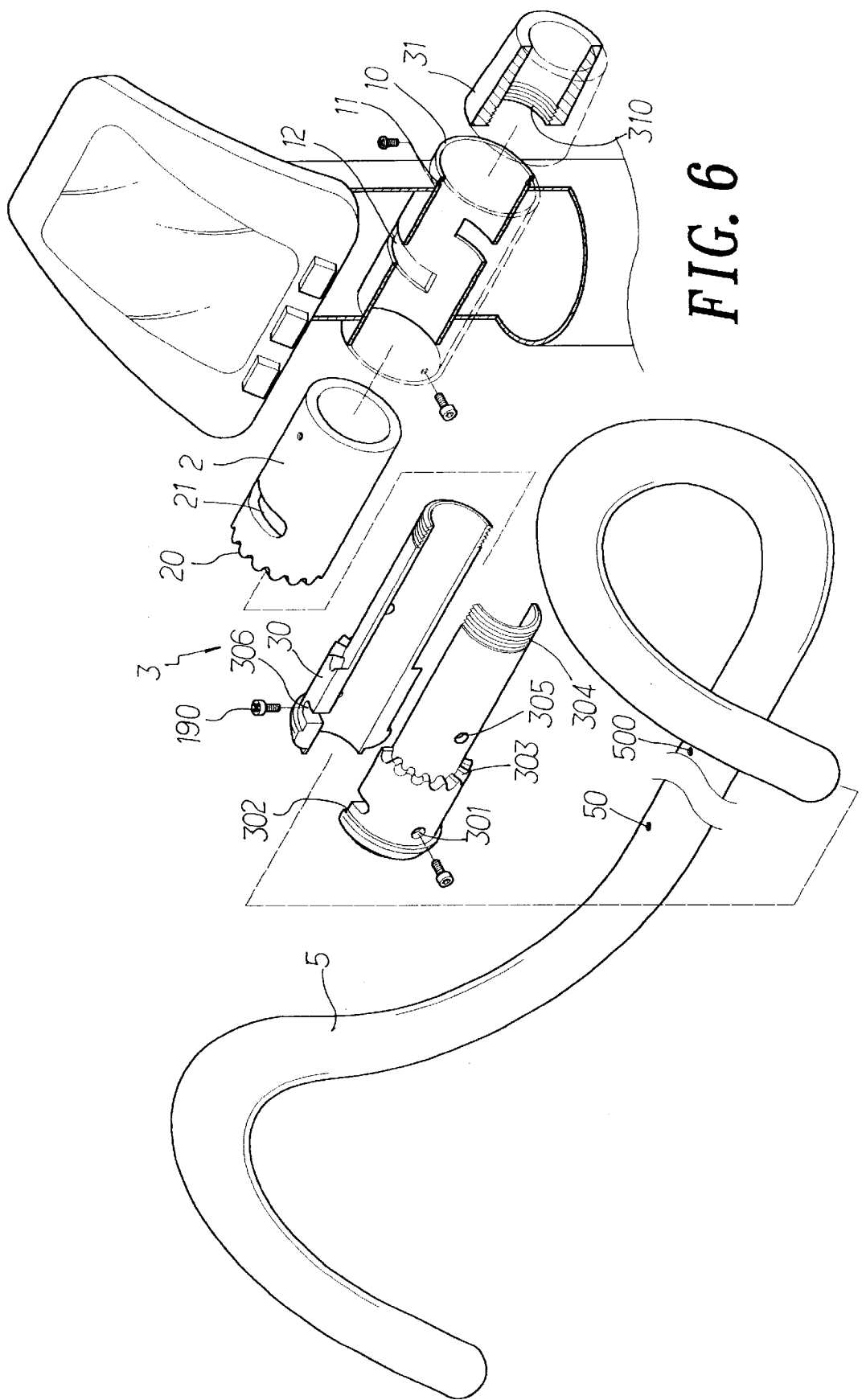
FIG. 6 is an exploded view to show a second embodiment of the handle assembly of the present invention.
Figure 9:
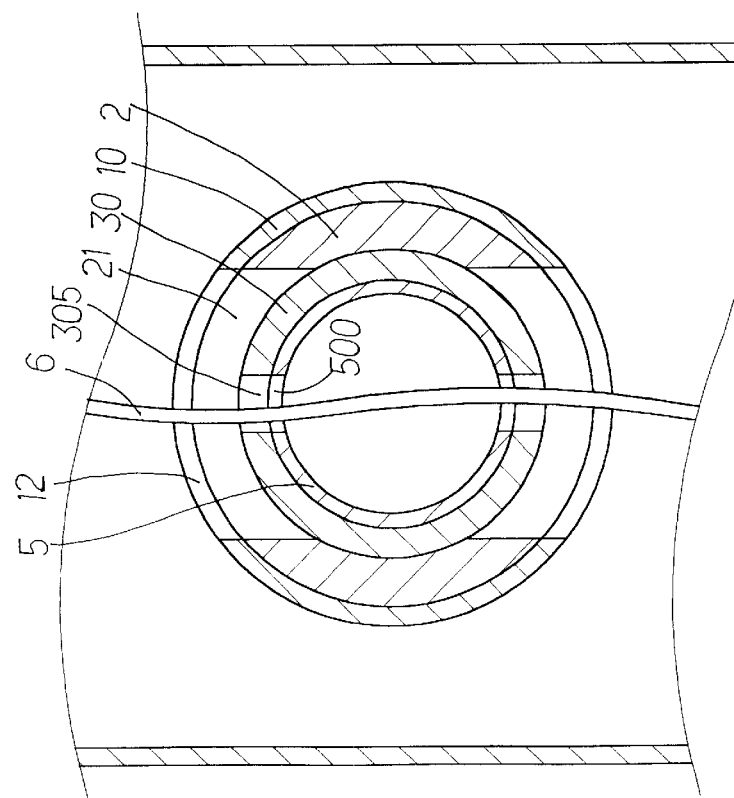
FIG. 9 is a top cross sectional view to show a cable extends through the handle assembly as shown in FIG. 6.
Figure 11:
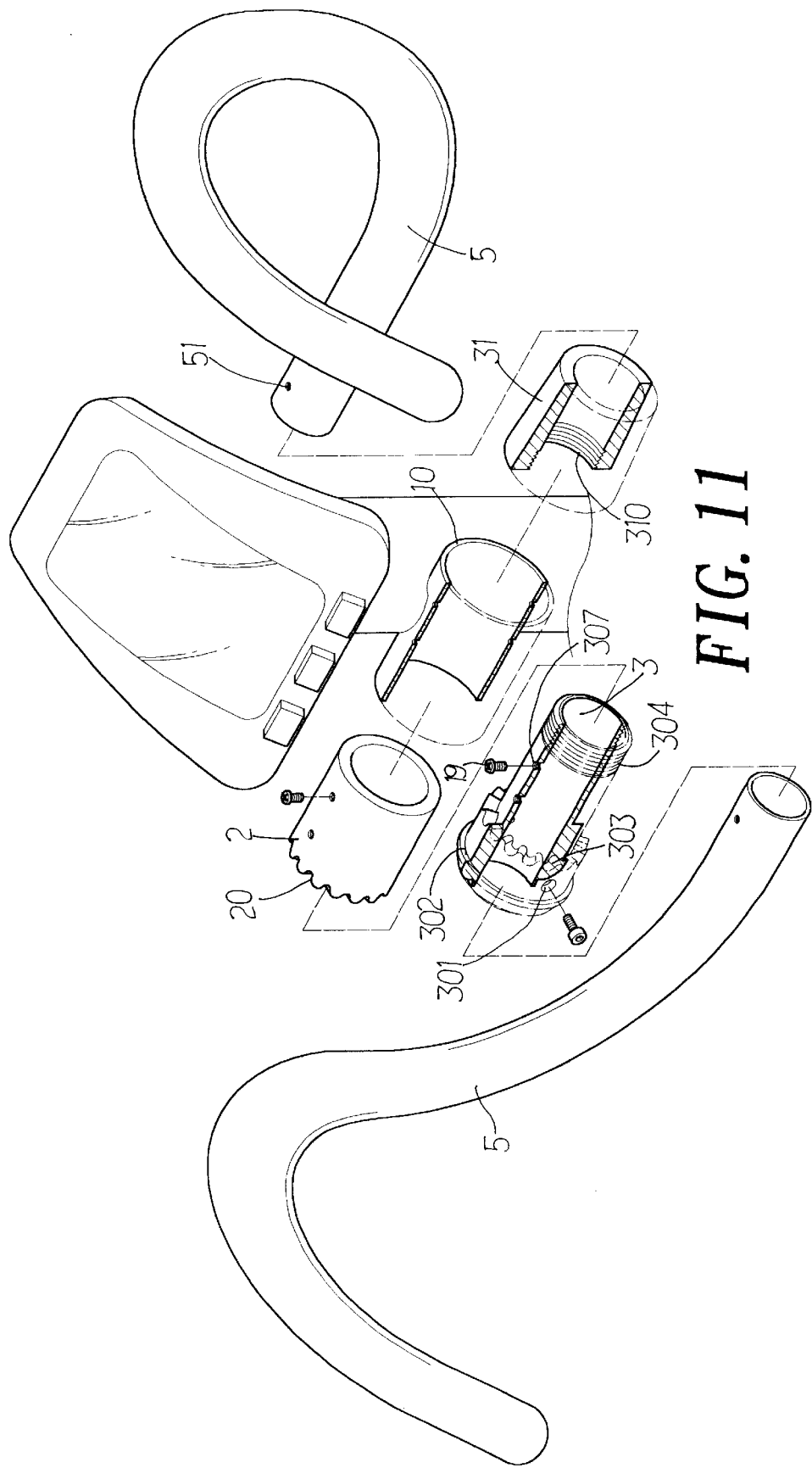
FIG. 11 is an exploded view to show a third embodiment of the handle assembly of the present invention.

FIGS. 6, 7 and 9 shows a second embodiment of the handle assembly wherein the tube 10 extends through the handle post 1 and has an elongate hole 12. The positioning tube 2 securely received in the tube 10 has a first slot 21 which is located in alignment with the elongate hole 12. Each of the sleeve 3 and the handle 5 has a hole 305/500 defined therethrough so that a cable 6 such as a brake cable or signal cable extends through the elongate hole 12, the first slot 21 and the two holes 305, 500. A second slot 306 is defined in the head 30 of the sleeve 3 and a limit bolt 190 is located in the second slot 306 and engaged with the handle 5. The bolt 190 limits the angle that the handle 5 is rotated when the bolt 190 contacts an inner end of the second slot 306.

Figure 10:
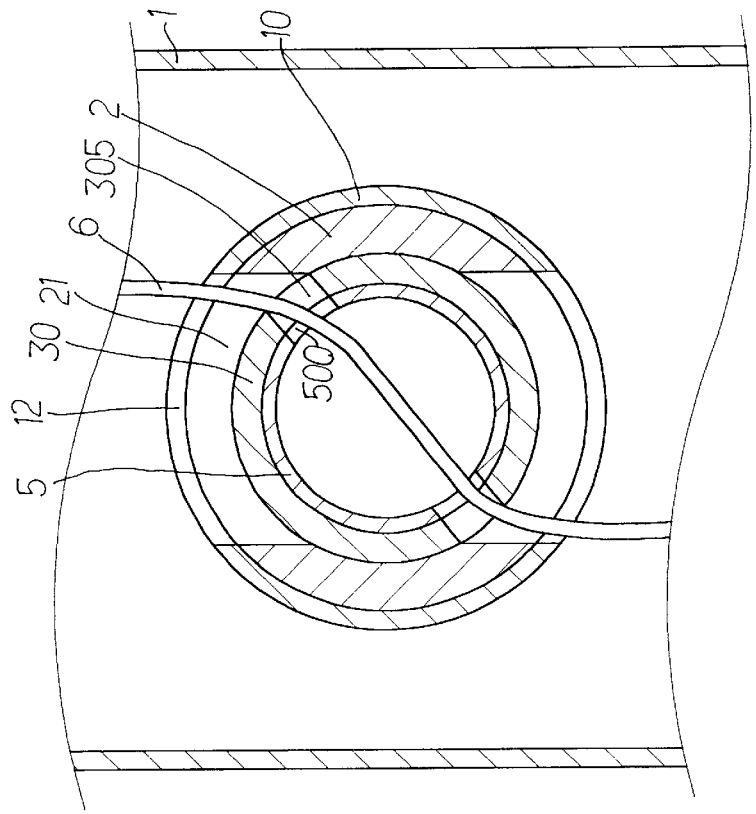
FIG. 10 is a top cross sectional view to show a cable extending through the handle assembly as shown in FIG. 6 is bent together with the rotation of the handle.

FIG. 10 shows that the handle 5 is rotated by the same way described above and the cable 6 is bent together with the rotation of the handle 5. The cable 6 can still be pulled freely.

While we have shown and described various embodiments in accordance with the present invention, it should be clear to those skilled in the art that further embodiments may be made without departing from the scope of the present invention.

What is claimed is:

1. An angle adjustable handle assembly comprising:

a positioning tube adapted to be fixedly connected to a handle post and having a toothed end;

a sleeve movably extending through said positioning tube and having a head on a first end of said sleeve, said head having a toothed shoulder which is engaged with said toothed end of said positioning tube, a threaded portion defined in a second end of said sleeve and a locking member threadedly engaged with said threaded portion, and a handle extending through said sleeve and a bolt extending through said head of said sleeve and engaged with said handle.

2. The assembly as claimed in claim 1 further comprising a tube adapted to be connected to said handle post and said positioning tube being fixedly received in said tube, said head of said sleeve having a flange which contacts an end of said tube and said locking member contacting the other end of said tube to securely position said handle.

3. The assembly as claimed in claim 1, wherein said positioning tube has a first slot and each of said sleeve and said handle has a hole defined therethrough, a cable extending through said two holes and said first slot.

4. The assembly as claimed in claim 1 further comprising a second slot defined in said head of said sleeve and a limit bolt located in said second slot and engaged with said handle.

* * * * *